United States Patent [19]
Giles

[11] 3,751,027
[45] Aug. 7, 1973

[54] COLLET AND COLLET FIXTURE

[76] Inventor: Charles E. Giles, 3654 Overland, Los Angeles, Calif. 90034

[22] Filed: Aug. 2, 1971

[21] Appl. No.: 168,106

[52] U.S. Cl.................. 269/152, 279/43, 279/50, 279/57
[51] Int. Cl.................... B25b 1/24, B23b 31/20
[58] Field of Search.......................... 269/101, 152; 279/50, 43, 57

[56] References Cited
UNITED STATES PATENTS

| 132,541 | 10/1872 | Peckham | 279/43 |
|---|---|---|---|
| 2,147,885 | 2/1939 | Dean | 279/50 |
| 2,669,181 | 2/1954 | Cooper et al. | 279/43 |
| 2,856,192 | 10/1958 | Schuster et al. | 279/43 X |
| 2,889,150 | 6/1959 | Goldring et al. | 279/4 |
| 3,404,897 | 10/1968 | Carter et al. | 279/50 |

Primary Examiner—James L. Jones, Jr.
Assistant Examiner—Joseph T. Zatarga
Attorney—John Joseph Hall

[57] ABSTRACT

An improved collet and collet fixture provides an adjustable height for a work piece held in the collet so that the work piece may be held at the proper height. The collet is locked in position from the bottom by the fixture, thereby providing a secure location and holding of the collet and accurate machining of the work piece.

1 Claim, 6 Drawing Figures

INVENTOR.
CHARLES E. GILES
By
John Joseph Hall
ATTORNEY.

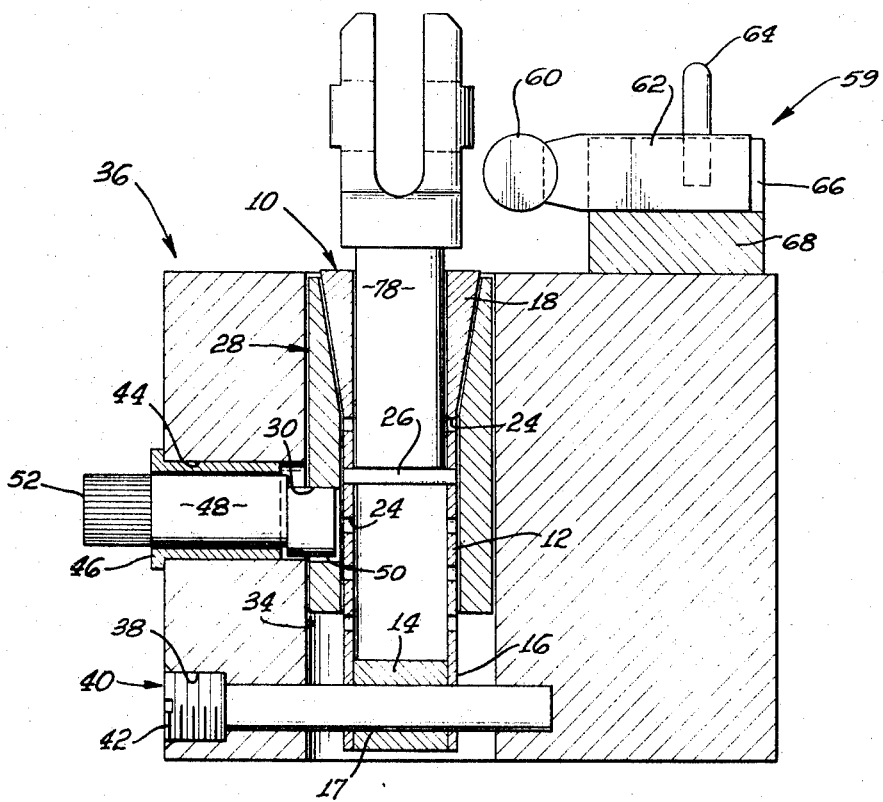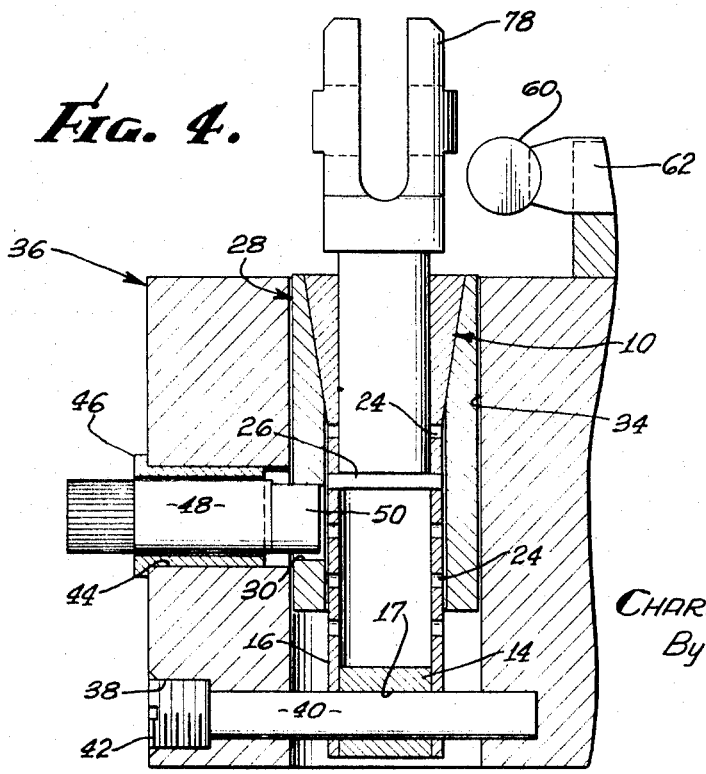

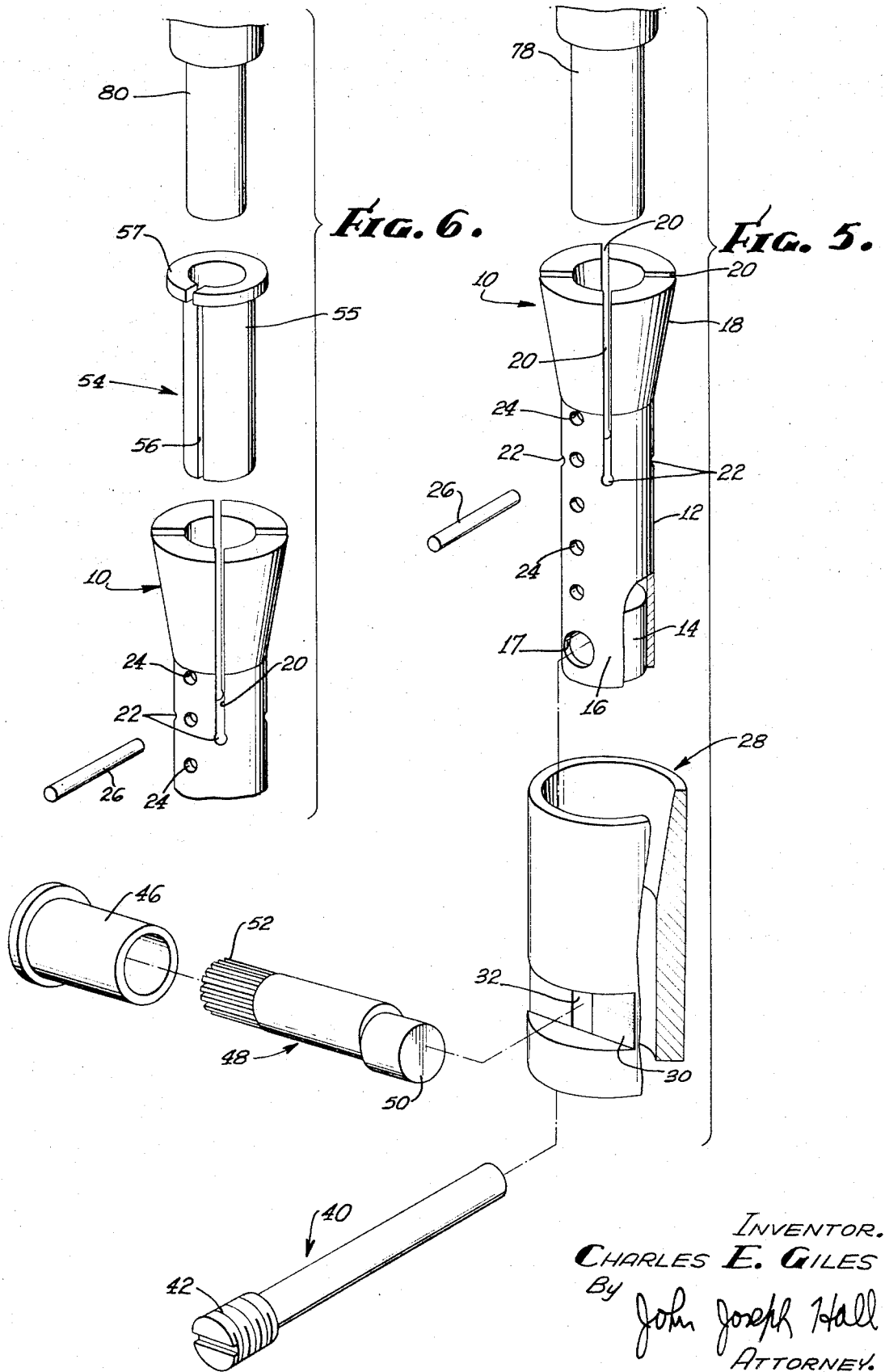

COLLET AND COLLET FIXTURE

BACKGROUND OF THE INVENTION

1. Field of the Invention

This invention relates to a new and improved collet and collet fixture for locating and holding a work piece for machining.

2. Prior Art

Although various types of collets and collet fixtures are known in the prior art, applicant knows of no collet and collet fixture which is adjustable in height and which is locked in position from the bottom.

SUMMARY OF THE INVENTION

The collet is formed in a hollow cylindrical shape with a flared upper end. The collet body has four slots cut from the flared end toward the middle of the collet body. The collet provides an easily adjustable height for a work piece by two series of uniform holes extending longitudinally on opposite sides of the collet body in conjunction with a height adjusting slip fit pin.

The collet is securely locked in position in the collet fixture from the bottom of the collet by a locking pin inserted through a bore in the collet and threaded in a bore of the collet fixture body.

The collet is tightened in position by a cam shaft in conjunction with a collet thrust sleeve inserted in the collet fixture body. A collet reducer is provide to fit inside the collet to provide easy means for holding work pieces of varying diameters without removing the collet from the collet fixture body.

The collet fixture also includes an alignment bar and guide to align the flat surfaces of work pieces such as an eye bolt or clevis parallel to the collet fixture body and parallel to the travel of the machine table used to machine the work piece.

It is, therefore, an object of my invention to provide a new and improved design of a collet for locating and holding a work piece with great accuracy.

Another object of my invention is to provide a collet which is held in position in the collet fixture body from the bottom portion of the collet.

A further object of my invention is to provide a collet which has the capability of easy adjustment of the height of the work piece to the proper height for machining.

A still further object of my invention is to provide a collet fixture body which securely and accurately holds and locates the collet.

A yet further object of my invention is to provide alignment means for aligning the surfaces of the work piece in proper position with respect to the collet fixture body and machine table, in conjunction with a guide.

These and other objects will be more readily understood by reference to the following specification and claims, taken in conjunction with the accompanying drawings, in which FIG. 1 is a front elevational view of an embodiment of my invention showing the collet fixture body in position on a machine table with a clevis work piece and eye bolt work piece held in position by collets.

FIG. 3 is a section taken along line 3—3 of FIG. 1.

FIG. 4 is a view similar to FIG. 3 showing the cam shaft rotated and the collet tightened around the clevis.

FIG. 5 is an exploded view of the various components of my invention, showing a portion of a work piece at the top.

FIG. 6 is a view showing the employment of a collet reducer element for varying the interior diameter of the collet.

Figure 1:
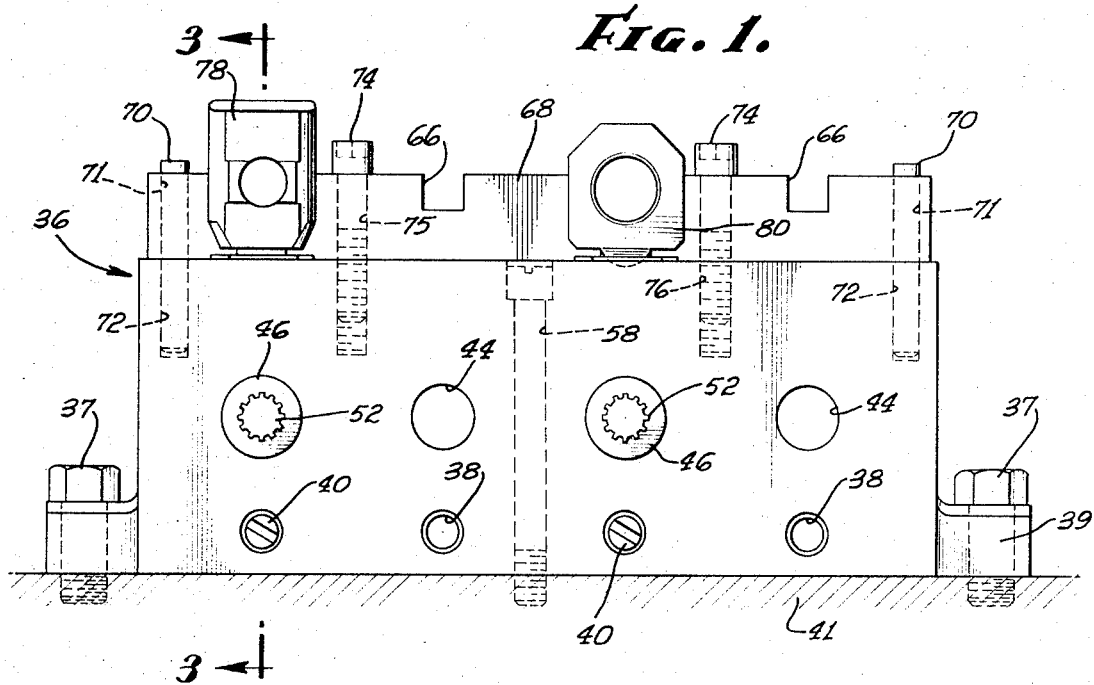

The collet 10 has a hollow cylindrical collet body 12 of uniform interior diameter closed by a cylindrical plug 14 at its lower end 16. Any suitable means may be used to fix the plug 14 in position. A cylindrical bore 17 extends through plug 14 from one side of collet body 12 to the other side. The other end 18 of collet body 12 is flared in its outer circumference for about a third of the length of the collet 10. Both ends 16 and 18 are flat, and are at right angles to the longitudinal axis of the collet 10.

Four slots 20 through the collet body 12 extend from the flared end 18 about half way along the length of the collet body 12. The slots 20 are arranged so that one pair of slots is located in a vertical plane which is at right angles to another vertical plane passing through the remaining pair of slots 20. The inner ends of slots 20 terminate in circular holes 22 to prevent possible splitting of collet 10.

The middle portion of collet body 12 is provided with a plurality of uniform size circular openings 24 arranged vertically along the length of collet body 12 on opposite sides so that a height adjusting slip fit pin 26 may be inserted through corresponding openings 24 on opposite sides of collet body 12, at right angles to the longitudinal axis of collet 10. The embodiment shown in FIG. 5 discloses an optimum number of six circular openings 24 on each side of the collet body 12. The openings 24 on each side of the collet body 12 are located in a vertical line located equidistant from the adjoining slots 20.

The collet 10 is insertable into a collet thrust sleeve 28 having a uniform outer cylindrical diameter. The outer circumference of collet thrust sleeve 28 has a slot 30 cut out of its lower portion at right angles to the longitudinal axis of the sleeve 28. A rectangular opening 32 is cut in the middle portion of slot 30.

The inner diameter of collet thrust sleeve 28 is outwardly flared at its upper portion to correspond with the flared end 18 of collet 10. The lower portion of the inner diameter of collet thrust sleeve 28 corresponds to the lower outer diameter of collet body 12 but does not extend to the lower end of the collet 10.

The collet thrust sleeve 28 with the collet 10 inserted, fits into a cylindrical bore 34 formed in collet fixture 36.

Figure 2:
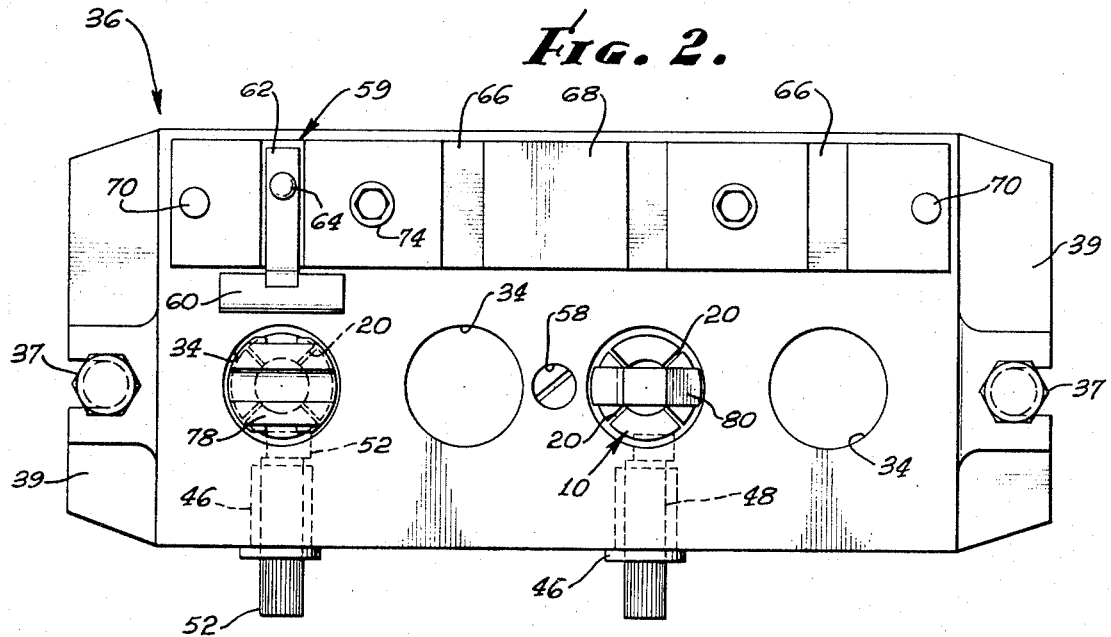
FIG. 2 is a top plan view of FIG. 1.

Collet fixture 36 as shown in FIGS. 1 and 2 of the drawings discloses four collet fixture body units which may be formed from a single metal block. The units are each identical in form, except for alternating the threaded bore 38 opening into cylindrical bore 34 from one side to the other, and for similarly alternating the smooth bore 44.

For convenience, a unit of collet fixture 36 will be referred to as collet fixture body 36 hereinafter. Each collet fixture body 36 has a threaded bore 38 opening into cylindrical bore 34 and located in a plane perpendicular to the longitudinal axis of cylindrical bore 34. The collet fixture 36 is held in position by bolts 37 inserted through slotted flanges 39 at each end of collet fixture 36, thereby firmly securing the collet fixture 36, to the machine table 41 (shown in part in FIG. 1.).

Collet fixture 36 is rectangular in shape, having its flat top and flat bottom parallel to each other, and its sides forming right angles with its top and bottom.

Locking pin 40 fits into threaded bore 38 and has a threaded end 42 corresponding to the threads of threaded bore 38. Above threaded bore 38 and located in the same plane, is a smooth bore 44 which extends into cylindrical bore 34. Bushing 46 fits into smooth bore 44 and receives a cam shaft 48 with cam 50 formed at its inner end and with circular splines 52 formed in its outer end.

Collet reducer 54 with a hollow cylindrical body 55 and a longitudinal slot 56 on one side from top to bottom fits into collet 10. Circular flange 57 at the top of collet reducer 54 extends outwardly over the top of collet 10 and keeps the collet reducer 54 in position.

The middle portion of collet fixture 36 has a longitudinal bolt hole 58 for additional securing of collet fixture 36 to the machine table 41.

The collet fixture 36 is provided with an alignment bar 59 having a solid cylinder 60 mounted at right angles to a square shank 62. A handle 64 is fixed perpendicularly to the top side of shank 62 in its middle portion.

Shank 62 fits into a square recess 66 cut in collet guide member 68. Similarly to the collet fixture 36, collet guide member 68 is formed in a series of four identical units, and a single unit will be referred to for convenience as a collet guide 68.

The collet guide member 68 is fixed in position by dowel pins 70 inserted through holes 71 in collet guide member 68 and into holes 72 at each end of collet fixture 36. Additional securing of the collet guide member 68 is provided by threaded bolts 74 inserted through holes 75 in collet guide member 68 and threaded into corresponding threads of holes 76 in collet fixture 36.

In operation, the collet fixture 36 is placed in position on a machine table 41, and firmly secured there by bolts 37 inserted through slotted flanges 39. Height adjusting pin 26 is placed in the desired location through openings 24 of collet body 12, and the collet 10 is inserted into collet thrust sleeve 28. The sleeve 28 is then inserted into cylindrical bore 34 of collet fixture body 36 with the collet 10.

Locking pin 40 is then inserted into threaded bore 38 and is threaded into position, firmly securing collet 10 in position. Bushing 46 with cam shaft 48 is then inserted into smooth bore 44 so that the cam 50 is rotatably inserted in slot 30 of collet thrust sleeve 28.

The work piece, such as a clevis or eyebolt, identified as numerals 78 and 80 respectively, in FIGS. 1 and 2, is then placed inside collet 10. Cam shaft 48 is then rotated to tighten collet 10 around the work piece and hold it firmly in position.

Alignment of the work piece is performed by use of the collet guide member 68 in position as shown in FIGS. 1 and 2, in conjunction with the alignment bar 59. The bar 59 is inserted into a recess 66 of the collet guide member 68 by its shank 62 and moved into contact with the flat surface of the work piece to make sure that the flat surface of the work piece is parallel to collet fixture 36 and parallel to the travel of the machine table.

In this manner, extremely accurate machine work can be easily performed by the use of my invention. Also, the collet 10 can readily accommodate various diameters and sizes of work pieces by the use of varying sizes of the collet reducer 54, which may be easily slipped into position inside collet 10 as desired. Various adjustments of height to accommodate various sizes of work pieces can be easily accomplished by relocating height adjusting slip pin 26. Because of locking pin 40, the collet 10 is firmly secured in position and provides a ready capability for precision machine shop work.

The flared or tapered end 18 of collet body 12 has an optimum angle of about 10° from the longitudinal axis of collet 10. This angle may vary from 5° to 15° from said axis without adversely affecting the operation of collet 10. The ratio or proportion of the length of the flared end 18 with respect to the overall length of collet 10 may vary from a minimum of about 20 percent to a maximum of about 40 percent, about 30 percent being an optimum.

All of the parts and components of my invention may be made of any suitable material, such as a mild steel that has been case hardened.

The length of the hollow cylindrical body 55 of collet reducer 54 may vary from a minimum of about two-thirds the length of the flared end 18 of collet body 12 to a maximum of the entire length of the flared end 18 and more, the only limiting factor being the obstruction of circular openings 24.

Although I have described preferred embodiments of my invention, it is understood that numerous changes in construction and arrangement of parts and components may be made within the scope of my invention as hereinafter claimed.

I claim:

1. A collet for accurately positioning and holding a work piece, comprising:

a hollow cylindrical body having a uniform interior diameter and an outer circumference flared outwardly at its upper end, said upper end having a flat top surface, a plurality of slots cut from the flared end toward the middle of said cylindrical body, a plurality of locating openings arranged vertically on each side of said cylindrical body on opposite sides of a plane extending through the longitudinal axis of the collet, said openings being located independently of said slots, and a plug member at the lower end of the collet closing said lower end and having an opening extending therethrough from one side of the body to the other and in a plane perpendicular to the longitudinal axis of the collet.

* * * * *